(12) United States Patent
Guntoro et al.

(10) Patent No.: US 11,449,737 B2
(45) Date of Patent: Sep. 20, 2022

(54) MODEL CALCULATION UNIT AND CONTROL UNIT FOR CALCULATING A MULTILAYER PERCEPTRON MODEL WITH FEEDFORWARD AND FEEDBACK

(71) Applicant: Robert Bosch GmbH, Stuttgart (DE)

(72) Inventors: Andre Guntoro, Weil der Stadt (DE);
Heiner Markert, Stuttgart (DE);
Martin Schiegg, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 867 days.

(21) Appl. No.: 16/330,625

(22) PCT Filed: Sep. 4, 2017

(86) PCT No.: PCT/EP2017/072043
§ 371 (c)(1),
(2) Date: Mar. 5, 2019

(87) PCT Pub. No.: WO2018/046416
PCT Pub. Date: Mar. 15, 2018

(65) Prior Publication Data
US 2020/0226450 A1    Jul. 16, 2020

(30) Foreign Application Priority Data

Sep. 7, 2016   (DE) .......................... 102016216950.5

(51) Int. Cl.
*G06F 13/28* (2006.01)
*G06N 3/063* (2006.01)
*G06N 3/04* (2006.01)

(52) U.S. Cl.
CPC ............. *G06N 3/063* (2013.01); *G06F 13/28* (2013.01); *G06N 3/04* (2013.01)

(58) Field of Classification Search
CPC ........... G06F 13/28; G06N 3/063; G06N 3/04
See application file for complete search history.

(56) References Cited

U.S. PATENT DOCUMENTS 5,517,600 A * 5/1996 Shimokawa ........... G06N 3/063
706/15
5,583,964 A   12/1996 Wang
(Continued)

FOREIGN PATENT DOCUMENTS

CN       101310294 A  * 11/2008  ............. G05B 13/00
CN       106062786 B  * 12/2019  ............... G06N 3/04
(Continued)

OTHER PUBLICATIONS

International Search Report for PCT/EP2017/072043, dated Dec. 13, 2017.
(Continued)

*Primary Examiner* — Cheng Yuan Tseng
(74) *Attorney, Agent, or Firm* — Norton Rose Fulbright US LLP; Gerard Messina (57) ABSTRACT

A model calculation unit for calculating a multilayer perceptron model, the model calculation unit being designed in hardware and being hardwired, including: a process or core; a memory; a DMA unit, which is designed to successively instruct the processor core to calculate a neuron layer, in each case based on input variables of an assigned input variable vector and to store the respectively resulting output variables of an output variable vector in an assigned data memory section, the data memory section for the input variable vector assigned to at least one of the neuron layers at least partially including in each case the data memory sections of at least two of the output variable vectors of two different neuron layers.

11 Claims, 8 Drawing Sheets

(56) References Cited

U.S. PATENT DOCUMENTS

| | | | | |
|---|---|---|---|---|
| 5,787,393 | A * | 7/1998 | Inazumi | G10L 15/16 704/238 |
| 5,987,444 | A * | 11/1999 | Lo | G06N 3/08 706/14 |
| 6,601,051 | B1 * | 7/2003 | Lo | G06N 3/084 706/30 |
| 8,788,444 | B2 * | 7/2014 | Ball | G06N 3/105 700/250 |
| 8,990,132 | B2 * | 3/2015 | Lo | G06N 3/049 706/26 |
| 2020/0237302 | A1 * | 7/2020 | Schneider | A61B 5/4884 |

FOREIGN PATENT DOCUMENTS

| | | |
|---|---|---|
| DE | 29521338 U1 | 3/1997 |
| JP | H03235723 A | 10/1991 |
| JP | H06175999 A | 6/1994 |
| JP | 2015015024 A | 1/2015 |

OTHER PUBLICATIONS

Eppler W et al., "High Speed Neural Network Chip for Trigger Purposes in High Energy Physics", Design, Automation and Test in Europe, Proceedings Paris, France, Los Alamitos, CA, USA, Comput. Soc, 1998, pp. 108-115, XP010268412.

Richard Fiifi Turkson et al., "Artificial Neural Network Applications in the Calibration of Spark-Ignition Engines: an Overview", Engineering Science and Technology, an International Journal, vol. 19, No. 3, 2016, pp. 1346-1359, XP055420859.

Keuntak Yang et al., "A Multi-Layer Perceptron Soc for Smart Devices", Computer Science and Engineering, vol. 2, No. 7, 2013, pp. 133-137, XP05503611.

Tianshi Chen et al., "Diannao", Architectural Support for Programming Languages and Operating Systems, ACM, USA, 2014, pp. 269-284, XP058044553.

* cited by examiner

MODEL CALCULATION UNIT AND CONTROL UNIT FOR CALCULATING A MULTILAYER PERCEPTRON MODEL WITH FEEDFORWARD AND FEEDBACK

FIELD

The present invention relates to the calculation of functional models in a separate hardwired model calculation unit, in particular, for calculating multilayer perceptron models.

BACKGROUND INFORMATION

Functions of controls of technical systems such as, for example, internal combustion engines, electric drives, battery storages and the like are frequently implemented with models, which represent a mathematical image of the real system. However, physical models, in particular, in the case of complex relationships, lack the required calculation accuracy and, in the case of modern processing capacities, it is generally difficult to calculate such models within the real time demands required of an engine control unit. For such cases, it is contemplated to use data-based models, which describe relationships between an output variable and input variables solely on the basis of training data obtained with the aid of a test bench or the like. Data-based models are suitable, in particular, for modelling complex relationships, in which multiple input variables interrelating with one another are suitably considered in the model. With the aid of data-based modelling, the modelling also offers the possibility of supplementing the model by adding individual input variables.

Data-based functional models are generally based on a large number of nodes in order to achieve a modelling accuracy sufficient enough for the respective application. The large number of nodes requires a high processing capacity for calculating a model value with a data-based functional model such as, for example, a Gaussian process model or a multilayer perceptron model. In order to be able to calculate such a data-based functional model in a control unit application in real time, model calculations units based on a hardware design may therefore be provided.

SUMMARY

According to the present invention, a model calculation unit is provided for calculating a neuron layer of a multilayer perceptron model, as well as a control unit and a use of the control unit.

Additional example embodiments are described herein.

According to a first aspect of the present invention, a model calculation unit is provided for calculating a multilayer perceptron model, the model calculation unit being designed in hardware and being hardwired, includes:
- a processor core, which is designed to calculate one or multiple output variables of an output variable vector of a neuron layer of the multilayer perceptron model that includes a number of neurons as a function of one or of multiple input variables of an input variable vector;
- a memory, in which a data memory area is provided, in which each neuron layer is assigned a data memory section for storing the input variables of the input variable vector, and a data memory section for storing the output variables of the output variable vector;
- a DMA unit, which is designed to successively instruct the processor core to calculate a neuron layer, in each case based on input variables of the assigned input variable vector, and to store the respectively resulting output variables of the output variable vector in the assigned data memory section, the data memory section for the input variable vector assigned to at least one of the neuron layers at least partially including in each case the data memory sections of at least two of the output variable vectors of two different neuron layers.

The above model calculation unit provides a design, which makes it possible to calculate multiple neuron layers of a multilayer perceptron model (MLP model) as part of a data-based model, in each case having a variable number of neurons. The use of multilayer perceptron models represents a data-based modelling with a smaller number of node points than in comparable data-based models such as, for example, in a Gaussian process model.

One aspect of the above model calculation unit is to design the model calculation unit in hardware structures separately in a processor core in a control unit for calculating a neuron layer of a multilayer perceptron model. In this way, an essentially hardwired hardware circuit may be provided for implementing functions, which makes it possible to calculate one or multiple neuron layers of a multilayer perceptron model and, in the process, to ensure only a very low processing load in a software-controlled microprocessor of a control unit. As a result of the hardware acceleration provided by the model calculation unit, it is possible to calculate a multilayer perceptron model in real time, so that the use of such a model control unit becomes attractive for control unit applications for internal combustion engines in motor vehicles.

The above model calculation unit designed in hardware allows an automatic calculation of multiple neuron layers of a multilayer perceptron model successively taking place in a processor core in a control unit. By relocating a calculation of a multilayer perceptron model in a separate model calculation unit that has a hardwired design, it is possible to reduce the calculation load in a microprocessor of the control unit and to preferably reduce the communication between a microprocessor and the model calculation unit for calculating a multilayer perceptron model, and thus to minimize the time required for calculating a model value.

When calculating a model value for a multilayer perceptron model, the calculations are generally carried out in layers, an input variable of an input variable vector being fed to a first neuron layer and intermediate output variables of an intermediate output variable vector, which in turn serve as intermediate input variables for a downstream neuron layer of the perceptron model, being obtained by the calculation of the first neuron layer.

These calculations are carried out in succession in accordance with the number of neuron layers of the perceptron model, in order to obtain the model value as the result of a last neuron layer. For this purpose, a memory structure is provided which, together with a DMA unit, is able to undertake a control of the calculation sequence.

In addition to the above described perceptron model, which contains a purely successive calculation across various neuron layers, other perceptron models are available, which include a feedback network, i.e., a feedback of output variables of a neuron layer to several of the input values of an input variable vector of a preceding neuron layer. As a result, the storing of preceding states in the neurons may be implemented. These are referred to below as feedback perceptron models.

Perceptron models may also be provided, which include a feedforward network, i.e., in which a part of the output variables is not considered in at least one immediately subsequent neuron layer, so that a part of the intermediate output variables of a neuron layer is used as input variables of a neuron layer not immediately following, i.e., by skipping the immediately subsequent neuron layer. These perceptron models are referred to below as feedforward perceptron models. These perceptron models may also be designed in combination with feedback perceptron models.

By providing a data memory area that has respective sections for storing input variables of the input variable vector of a neuron layer and for storing input variables of an input variable vector for additional subsequent neuron layers, it is possible to provide an automatic calculation of the model value in the model calculation unit with no further copying process. In the process, the output variables of the output variable vector of each neuron layer are stored in each case in the section of the data memory area for storing the input variables of each next neuron layer to be calculated. With reactivation of the calculation of a corresponding neuron layer in the processor core by the DMA unit, it is possible to automatically calculate a predefined number of neuron layers of the multilayer perceptron model.

Feedback and/or feedforward perceptron models may be implemented by positioning a data memory section for the input variable vector of a neuron layer in the address area of the data memory area in such a way that these data memory sections assigned to output variable vectors of different neuron layers, wholly or partially overlap. Because the data memory area is not deleted or overwritten between the calls to calculate the perceptron model, the output variable vectors of previous calculations of neuron layers of the perceptron model continue to be available in certain data memory sections of the data memory area, and may be used as a function of the positioning of the data memory section of the input variable vector as part of the input variable vector for calculating a neuron layer. This automatically results in a feedback.

The skipping of a neuron layer in the feedforward perceptron models may be implemented in a similar manner by overlapping the section of the data memory area for storing the intermediate output variables of a neuron layer with the section of the data memory area for storing the input variables of a neuron layer not immediately following.

A configuration memory area, in particular, may be provided, which configures the sequence of the calculation and allows a number of neuron layers and a predefinable number of neurons for each neuron layer to be parameterized and their order of calculation to be established. The DMA unit also provides for addressing a section of the data memory area, from which input variables of an input variable vector are read and written into the output variables of an output variable vector of a neuron layer, in such a way that output variables of a calculation of one neuron layer are redefined as intermediate input variables for a subsequent neuron layer. By automatically starting a renewed calculation of a neuron layer, it is possible as a result to provide a sequence of a multilayer calculation of the perceptron model by a suitable parameterization in the configuration memory area of the memory of the processor core. In this way, it is possible to specify a processor core a task for calculating a multilayer perceptron model from a microprocessor and to retrieve or receive a model value as an output value of the multilayer perceptron model from the microprocessor after completion of the calculation, without further interventions by the microprocessor.

In addition, the data memory section for the input variable vector assigned to at least one of the neuron layers may also fully include the data memory section of the output variable vector of the preceding neuron layer.

Furthermore, the data memory section for the input variable vector assigned to at least one of the neuron layers may partially contain or include the data memory section of the output variable vector of a neuron layer other than the preceding neuron layer, in particular, of a preceding or subsequent neuron layer.

It may be provided that the data memory sections of the at least two output variable vectors of the two different neuron layers are adjacent to one another in the address area of the data memory area.

According to one specific embodiment, the memory may include a configuration memory area for each neuron layer for storing configuration parameters in a respective configuration memory section; the DMA unit being designed to successively instruct the processor core to calculate a neuron layer, in each case based on the configuration parameters of a respective configuration memory section and the input variable vector defined as a result, and to store in each case the resultant output variable vector in a data memory section of the data memory area defined by the corresponding configuration parameters.

It may also be provided that the DMA unit is designed to provide the configuration parameters for the next neuron layer to the processor core upon completion of the calculation of the neuron layer, the calculation being concluded as a function of one or of multiple configuration parameters.

According to one specific embodiment, the processor core may be designed to signal the DMA unit the end of the instantaneous calculation of the neuron layer, the DMA unit starting the calculation of the next neuron layer based on configuration parameters stored in an addition configuration memory section.

The processor core may also be designed to calculate for one neuron layer of a multilayer perceptron model that has a number of neurons an output variable for each neuron as a function of one or of multiple input variables of an input variable vector, of a weighting matrix having weighting factors and of an offset value predefined for each neuron, the offset value predefined for the neuron being applied to a sum of the values of the input variables weighted for each neuron with a weighting factor determined by the neuron and the input variable and the result being transformed using an activation function in order to obtain the output variable for the neuron in question.

According to one specific embodiment of the present invention, the processor core may be formed in a surface area of an integrated module.

According to another aspect of the present invention, a control unit is provided that includes a microprocessor and one or multiple of the above model calculation units, the control unit being designed, in particular, as an integrated circuit.

According to another aspect of the present invention, a use of the above control unit is provided as a control unit for controlling an engine system that includes an internal combustion engine and/or an electric drive and/or an energy store in a motor vehicle.

BRIEF DESCRIPTION OF THE DRAWINGS

Specific example embodiments are explained in greater detail below with reference to the figures.

DETAILED DESCRIPTION OF EXAMPLE EMBODIMENTS

Figure 1:
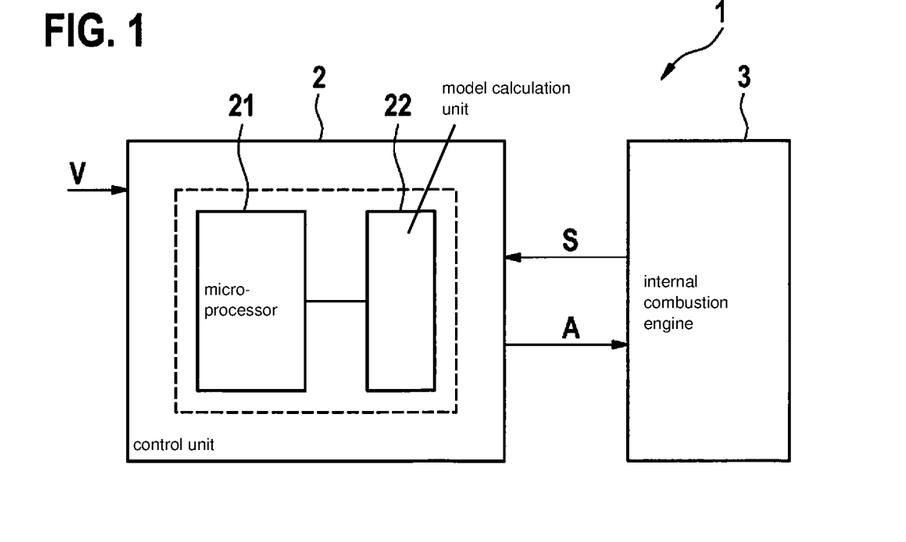
FIG. 1 schematically shows a representation of a control unit to be used for an engine system in a motor vehicle.

FIG. 1 schematically shows by way of example a representation of a control unit 2 for an engine system 1 that includes an internal combustion engine 3 as an example of a technical system to be controlled. Control unit 2 includes a microprocessor 21 and a model calculation unit 22, which may be designed as separate components or in an integrated manner in separate surface areas on a chip. Model calculation unit 22 represents, in particular, a hardware circuit, which may be structurally separate from a processor core of microprocessor 21.

Model calculation unit 22 is essentially hardwired and, unlike microprocessor 21, accordingly designed to execute a software code and thereby carry out a variable function predefined by software. In other words, no processor is provided in model calculation unit 22, so that the model calculation unit is not operable by a software code. Focusing on a predefined model function enables a resource-optimized implementation of such a model calculation unit 22. With its integrated design, model calculation unit 22 may be implemented to be surface-optimized, which also allows for rapid calculations.

Control unit 2 serves essentially to process sensor signals S or sensor variables, which are detected by a sensor system in internal combustion engine 3, and or external specifications V, and to cyclically apply values of one or multiple corresponding activation variables A to internal combustion engine 3 in fixed, predefined time intervals of, for example, 1-100 ms or with angular synchronism as a function of a crankshaft angle of an operated internal combustion engine, so that the internal combustion engine is operable in a manner known per se.

Figure 2:
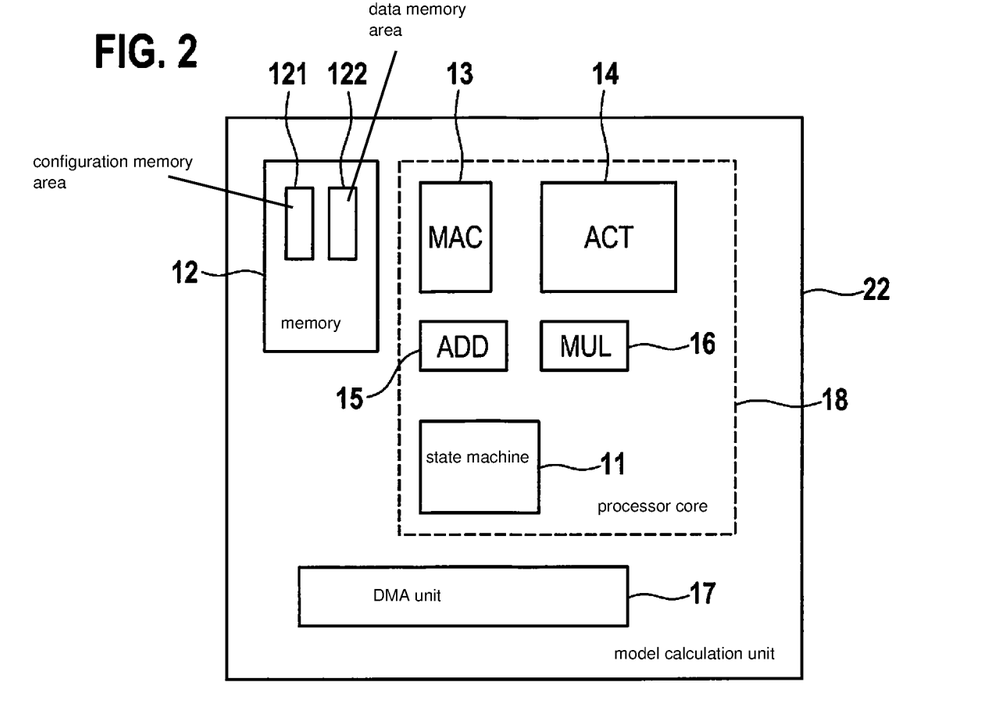
FIG. 2 schematically shows a representation of a calculation unit as part of the control unit.

A model calculation unit 22 is depicted in detail in FIG. 2. Model calculation unit 22 includes a state machine 11, a memory 12 and one or multiple operation blocks, which include, for example one or multiple MAC blocks 13 (MAC: Multiply-ACcumulate, for fixed point calculation or FMA: fused-multiply-add for floating point calculation) and an activation function calculation block 14 for calculating an activation function ACT, and, optionally an adder block 15 and/or a multiplication block 16. State machine 11 and the one or multiple operation blocks 13 and 14 form processor core 18 of model calculation unit 22. With the aid of state machine 11, it is possible to offset via nested loop calculations values of input variables stored in a data memory area 122 (input variable memory area) in memory 12, in order to obtain intermediate output variables or output variables, which are written into a corresponding output variable memory area of memory 12 assigned to the calculated neuron layer.

The calculation may be controlled with the aid of a DMA unit 17 (DMA: direct memory access), DMA unit 17 carrying out one or multiple copy operations in registers of the processor core and in data memory areas, which are relevant for the calculation of the respective neuron layer.

State machine 11 is designed to calculate a single neuron layer of a multi-layer perceptron model. State machine 11 may be described based on the following pseudocodes:

```
/*input transformation */
for (k=0; k<p7; k++) {
ut[k] = u[k]*p1[k] + p2[k];
}
/* loop calculation */
for (j=p8; j<p6; j++) {
  i = j * p7;
  t = p3[j];
  for(k=0; k<p7; k++) {
    t += V[i+k} * ut[k];
  }
  y[j] = act(t);
}
/*output transformation */
for (k=0; k<p6; k++) {
  z[k] = y[k] * p4[k] + p5[k];
}
``` where p7: maximum index value for the input variables of the input variable vector p8: minimum index value or start value for the calculation of the neurons of the active neuron layer p6: maximum index value for the neurons of the active neuron layer p3: offset value p1, p2: variables for the input transformation p4, p5: variables for the output transformation The following calculation may be carried out with the aid of the above pseudocode for each neuron of the neuron layer to be calculated:

$$y[j] = act(p3[j] + \Sigma_{k=0}^{p1-1} v_{j,k} * ut[k])$$

für j=0 . . . p6−1

Figure 3:
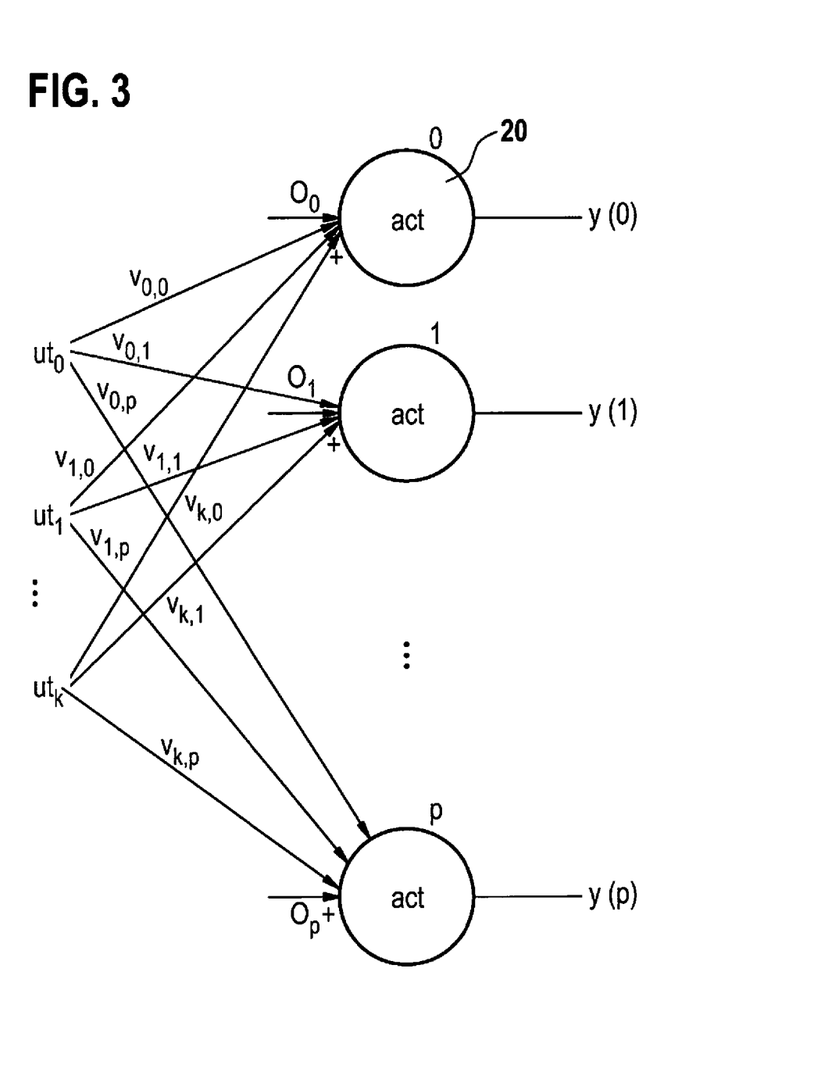
FIG. 3 schematically shows a representation of a neuron layer of an MLP model.
Figure 4A:
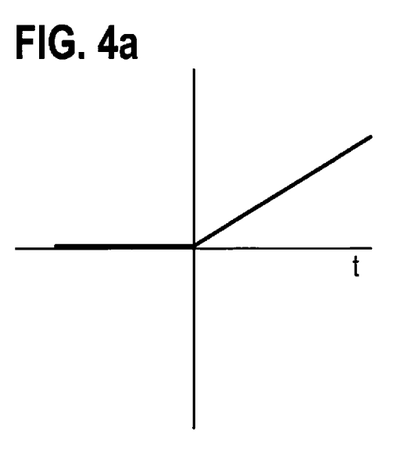
FIGS. 4a through 4d show representations of possible activation functions.
Figure 4B:
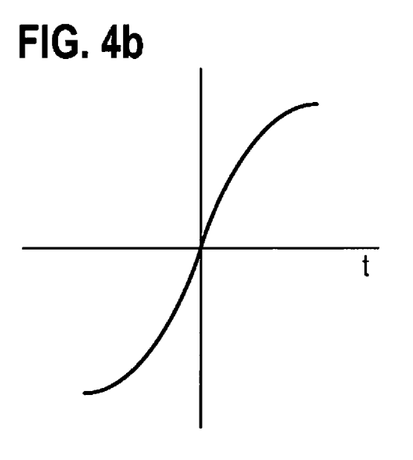
Figure 4C:
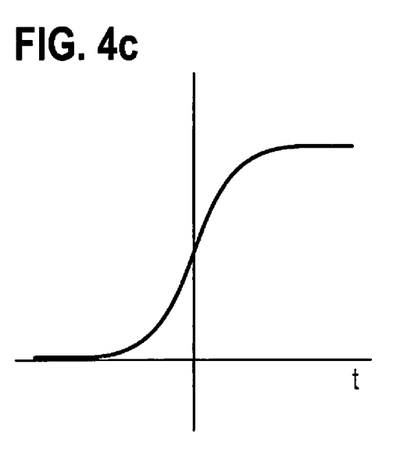
Figure 4D:
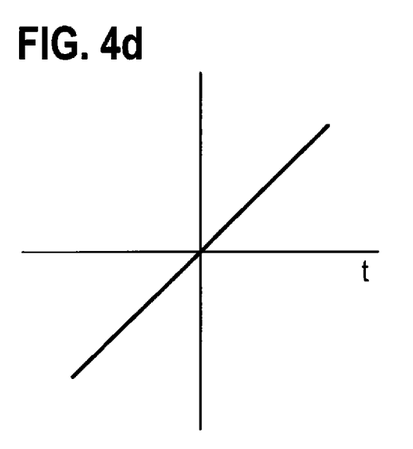

This represents a calculation for a neuron layer of a multi-layer perceptron model, as depicted in FIG. 3.

FIG. 3 shows a neuron layer of multiple neurons 20, to which values of input variables of an input variable vector $ut_0 \ldots ut_{p6-1}$ are fed. The values of the input variables are weighted with the aid of a corresponding predefined weighting matrix of weighting factors $v_{0 \ldots p7-1, 0 \ldots p6-1}$. The weighting takes place generally by multiplicative application with the assigned weighting factors $v_{0 \ldots p7-1, 0 \ldots p6-1}$. The weighting factors may in general also apply to the values of the input variable vector in other ways.

An offset value $O_0 \ldots O_{p6-1}$ is applied, in particular, additively applied, to the sums of the weighted values of the input variable vector $ut_0 \ldots ut_{p6-1}$. The result is transformed with a predefined activation function "act". The result obtained is a corresponding value of an output variable vector $y_0 \ldots y_{p6-1}$. A broader degree of freedom for the modeling exists due to the provision of the offset value $O_0 \ldots O_{p6-1}$ for each neuron.

By establishing the control variable p6, it is possible to adjust the number of neurons 20 of the neuron layer to be calculated. A multi-layer perceptron model may be used as an input variable vector for a calculation of a following neuron layer in model calculation unit 22 by using the values of output variable vector $y_0 \ldots y_{p6-1}$ of a neuron layer, so that the number of the neuron layers of the multi-layer perceptron model may be implemented by repeatedly calling up the function according to the aforementioned pseudocode or by repeatedly calling up model calculation unit 22 with correspondingly changed parameters.

An input transformation and/or output transformation of the input variables of the input variable vector or the output variables of the output variable vector may be carried out with the aid of the standardization variables p1 and p2, p4 and p5, respectively predefined for each neuron. This input transformation and/or output transformation of the input variables may also be skipped.

The layered calculation of the MLP model allows for a model calculation unit 22 with a slim design, so that its surface requirement in an integrated design is minimal. Model calculation unit 22 nevertheless enables a calculation of a multilayer perceptron model in a simple manner by recycling or redefining the values of the output variables of the output variable vector as input variables of an input variable vector for the calculation of an additional neuron layer.

One of multiple activation functions may be provided as activation function "act", which may be calculated by activation function calculation block 14 of model calculation unit 22. A bend function, a tangent hyperbolicus function, a sigmoid function or a linear function, for example, may be used as activation functions, as correspondingly depicted in FIGS. 4a through 4d.

Memory 12 of model calculation unit 22 includes a configuration memory area 121, which is able to store configuration parameters for a predefined number of neuron layers in respective configuration memory sections A. Configuration memory area 121 may be part of a main memory of the control unit, which may be accessed and used by both microprocessor 21 as well as by model calculation unit 22. Alternatively, configuration memory sections A may also be provided in a separate flash memory or in a memory exclusively for the processor core.

Figure 5:
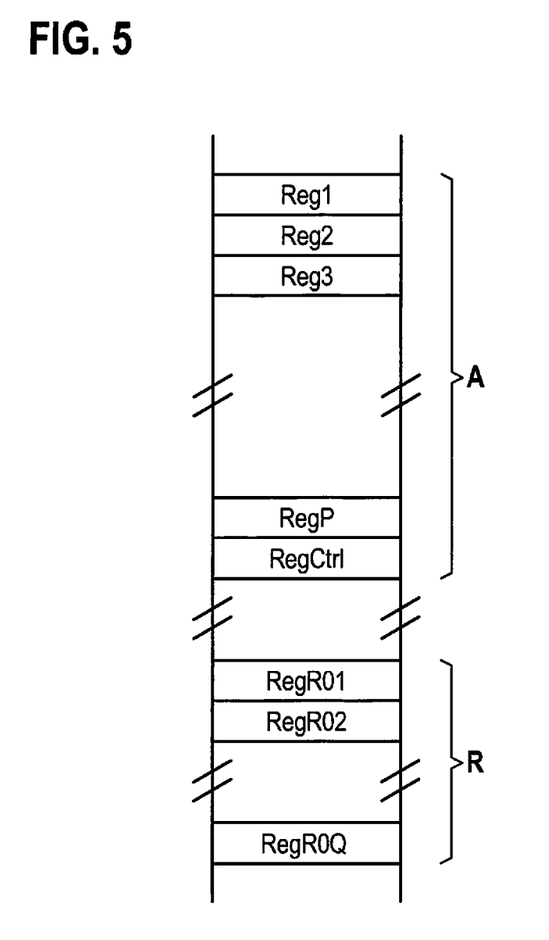
FIG. 5 shows a configuration memory section of a configuration memory area of the processor core.

Configuration memory sections A include individual memory addresses, in which the configuration parameters of model calculation unit 22 are stored according to a predefined order, as is depicted by way of example in FIG. 5. To use individual configuration memory sections A, the values stored there for the calculation of a neuron layer with the aid of DMA unit 17 are copied in registers of the processor core provided for such purpose. The copy process takes place without the assistance of microcontroller 21 or of processor core 18, but rather is carried out automatically by DMA unit 17.

Address positions Reg1 through RegP of each configuration memory section A include parameters for carrying out a calculation in the relevant neuron layer that is assigned to configuration memory section A of configuration memory area 121. Configuration memory positions Reg1 through RegP may, for example, store parameters p1 through p8 in accordance with the above pseudocode, and, in particular, store via corresponding address pointers, in which data memory sections (by indicating a corresponding start address of defined address areas) of data memory area 122 the input variables of the input variable vector or intermediate variables of the intermediate input variable vector relevant to the (instantaneously to be calculated) neuron layer in question, the weighting factors of the weighting matrix, the offset values of the offset vector are stored.

Data memory area 122 may be provided in a main memory of the control unit or in a memory assigned exclusively to model calculation unit 22. In addition, one of configuration parameters Reg1 through RegP may specify a start address for a data memory section D for storing the respective output variables of the resulting output variable vector obtained as the result of the calculation in the neuron layer. The use of address pointers has advantages, since the dimensions of the model parameters, of the input variable vector and of the output variable vector are variable.

Configuration memory area 121 may also provide an address position for storing a piece of calculation start information RegCtrl, which, when writing in a particular date, starts the calculation of the active neuron layer (i.e., of the layer assigned to respective configuration memory section A) in model calculation unit 22.

In addition, a separate status register memory area R may also include one or multiple address positions RegR01 through RegR0Q for storing pieces of status information. The pieces of status information may indicate feedbacks from the calculation of the respective neuron layer of the perceptron model. The pieces of status information may, for example, include a piece of information about a processing state of model calculation unit (idle/busy), about the progress of a calculation (position of the calculation pseudocode in the state machine, for example, calculation of the input transformation, of the main loop, etc.), about the validity of the parameters (incorrect address pointers, false/non-supported values (for example, INFinity or Not-a-Number in float)) and the like.

Unutilized memory addresses may also be provided in each configuration memory section A, in order to account for the block by block processing of configuration memory sections A by DMA unit 17.

Figures 6A, 6B:
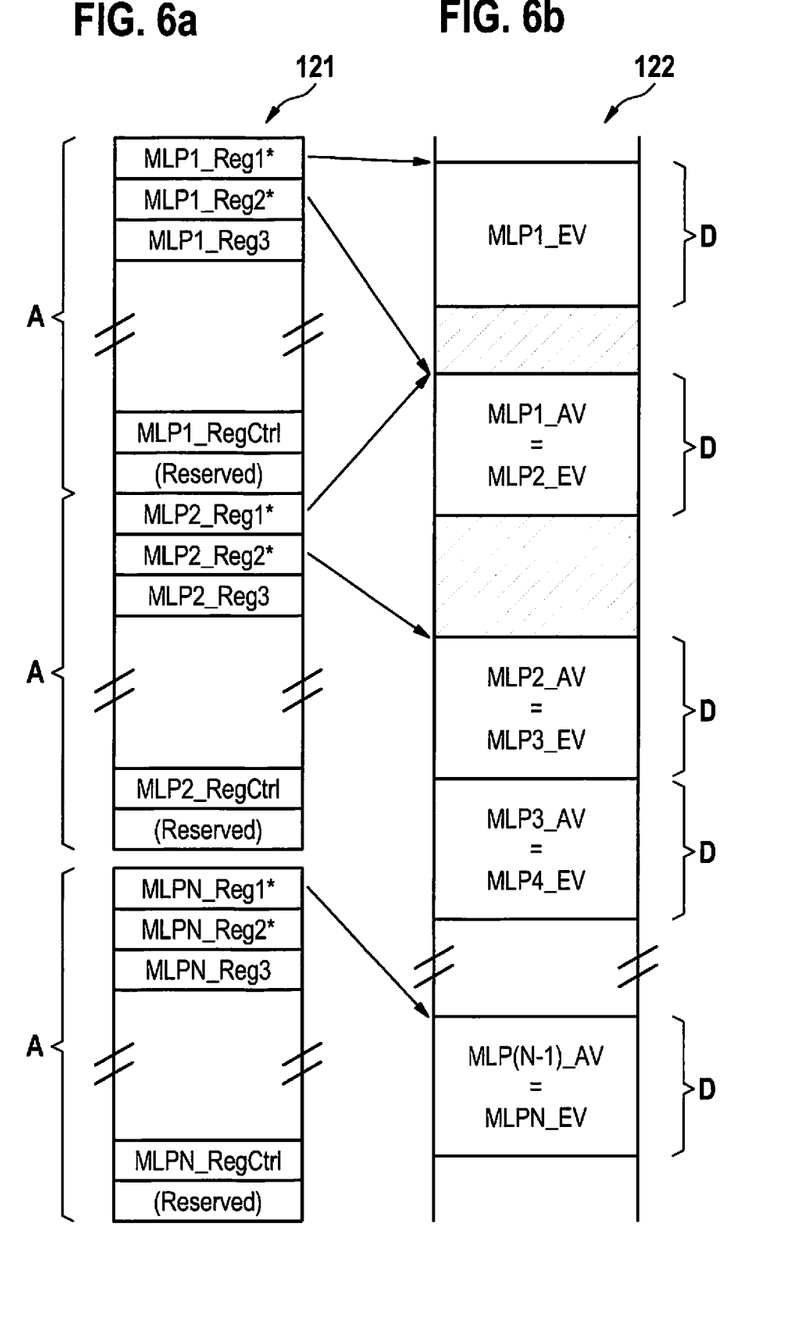
FIGS. 6a and 6b show a division of a configuration memory area and of a data memory area.

The arrangement of multiple configuration memory sections A in configuration memory area 121 is depicted in FIG. 6a, in which the configuration parameters are stored in successive configuration memory sections A, as depicted in FIG. 6a. There, an arrangement of N configuration memory sections is specified having configuration parameters for N neuron layers MLP1 ... MLPN. The configuration memory sections A are each preferably provided with the same variable, since the number of configuration parameters for each neuron layer does not change.

Some of the configuration parameters are provided as address pointers and are correspondingly labelled with "*". The address pointers, as depicted in FIG. 6b, point to start addresses of data memory sections D of data memory area 122, for example, in the main memory of the control unit, from which the input variables of input variable vector MLPx_EV or intermediate input variables MLPx_EV of the intermediate input variable vector (for example, MLP1_Reg1*, MLP2_Reg1*, etc.), weighting factors from the weighting matrix, the offset values of the offset vector are retrieved for calculating the neuron layer in question. One of the address pointers also points to a data memory section D for storing resultant output variables of output variable vector MLPx_AV or (given the presence of a neuron layer to be subsequently calculated) of resultant intermediate output variables of intermediate output variable vector MLPx_AV (for example, MLP1_Reg2*, MLP2_Reg2*, etc.). With the suitable parameterization of the configuration parameters in successive configuration memory sections A, it is preferably to be provided that the start address of data memory section D for storing the output variable vector of a neuron layer corresponds to the start address of data memory section D for storing the input variable vector or of the intermediate input variable vector of a following neuron layer.

Data memory sections D of data memory area 122 for the input variables and output variables are provided for each neuron layer with a predefined number of address positions, which specify a corresponding number of neurons of the corresponding neuron layer of the perceptron model. The start addresses of input variable vector MLP1_EV and output variable vector MLP1_AV of the individual neuron layer are partitioned according to the granularity of the memory access. In this way, one or multiple non-utilized data memory sections D may be formed, as is depicted by way of example in FIG. 6b. The non-utilized data memory sections may appear, for example, when the address pointer is only able to address "page"-wise, for example, in blocks of 8 or 16 bytes.

Thus, microprocessor 21 needs only to initialize DMA unit 17 in order to calculate in succession the multiple neuron layers of the perceptron model, without providing a corresponding program sequence control by the microprocessor. The sequence control via successive call-ups of the calculation of a neuron layer takes place via copying processes of DMA unit 17.

Figure 7:
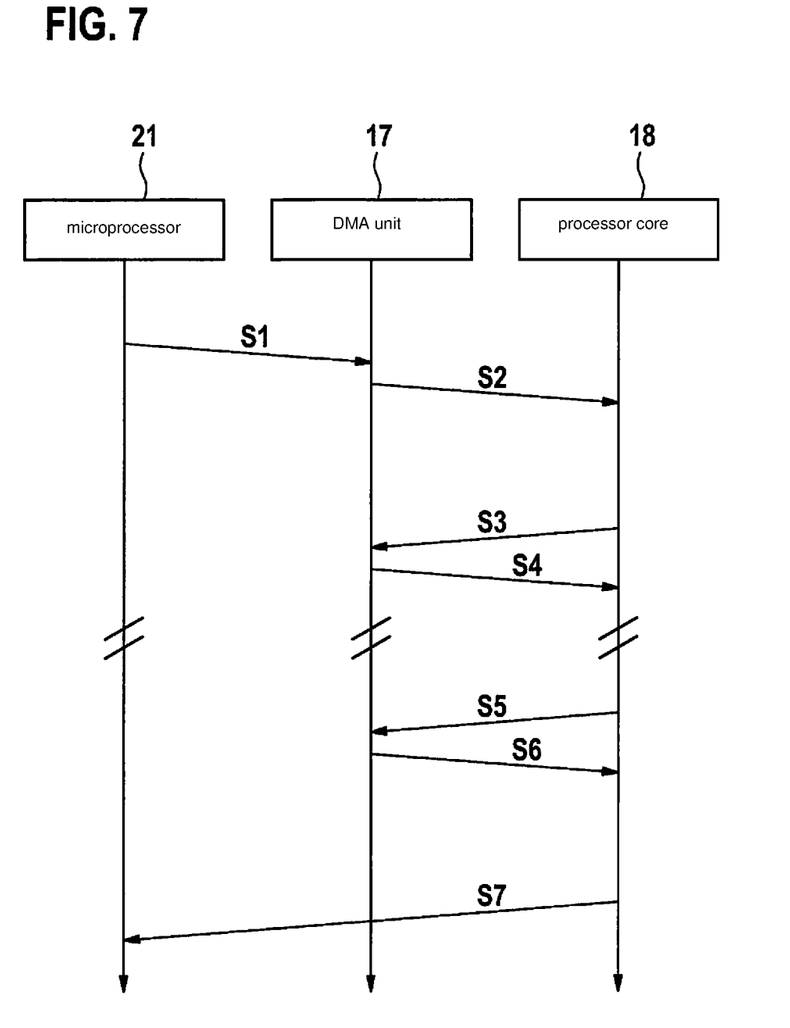
FIG. 7 shows a flow chart for illustrating the function of the DMA unit of the model calculation unit.

A flow chart is depicted in FIG. 7, which illustrates the control of the model calculation unit by DMA unit 17. Initially, a configuration is carried out by microprocessor 21, in which corresponding model parameters, i.e., the values of the input variables of the first neuron layer, of the weighting matrices for each of the neuron layers and offset values of the offset vector for each neuron layer, and configuration parameters are written into corresponding data memory sections A of data memory area 122 or configuration memory section A of configuration memory area 121, configuration parameters being defined in the corresponding configuration memory sections A of configuration memory area 121.

In step S1, DMA unit 17 is configured by microcontroller 21 as the copy target for a multiple-copy transfer, for example, with incremented source addresses of configuration memory area 121 and with the registers of the calculation unit. In this way, DMA unit 17 experiences the number of copy processes to be carried out for respective configuration parameter section A, and also the number of copy processes of the entire MLP model (=number of the MLP neuron layer).

DMA unit 17 starts the first copy process of first configuration parameter section A to the registers of the calculation unit and subsequently starts the calculation with the calculation of the first neuron layer in step S2 based on first configuration parameters (MLP1_Reg1-MLP1_RegP, RegCtrl) assigned to the first neuron layer. For this purpose, DMA unit 17 signals the start of the calculation, for example, by writing the calculation start information RegCtrl from configuration memory area 121 to the corresponding address position/register. The address pointers of the configuration parameters specify data memory sections D, from which the input variables of the input variable vector, the weighting factors from the weighting matrix and the offset values of the offset vector are to be drawn, in order to calculate the output variables of the output variable vector of the first neuron layer.

The output variables of the first neuron layer, once calculated, are located in a corresponding output variable memory block, which is stored by DMA unit 17 in a corresponding data memory section D of data memory area 122, based on the configuration parameters for the first neuron layer.

In step S3, processor core 18 signals DMA unit 17 that the calculation of the first neuron layer is completed. This may be achieved by the processor core 17 prompting an interrupt to DMA unit 17 using corresponding configuration parameters. For the calculation of an additional neuron layer, the output variables are accepted as intermediate input variables from the calculation of the first neuron layer by DMA unit 17 transferring the configuration parameters from configuration memory sections A of configuration memory area 121 assigned to the additional neuron layer into the registers of the calculation unit and, if necessary, storing the weighting factors of the weighting matrix as well as the offset values of the offset vector in data memory sections D indicated among the configuration parameters by the address pointer, insofar as these have not been stored there previously. The calculation is subsequently started in step S4.

The method of steps S3 and S4 is repeated for each additional neuron layer until the initially predefined number of configuration memory sections A to be copied is achieved. A corresponding configuration parameter for the calculation of the last neuron layer defines the interrupt call-up of processor core 18 by processor core 18 prompting an interrupt directly to microprocessor 21. Processor core 18 then signals a corresponding interrupt signal to microprocessor 21, which then retrieves or otherwise receives the model value. Alternatively, model calculation unit 22 may report the interrupt signal to DMA unit 17, and DMA unit 17 in turn reports the interrupt signal to microcontroller 21 (chained interrupts).

Configuration memory area 121 may also include configuration parameters that have corresponding references to memory sections for data required for the calculation. Once the calculation of a perceptron model is completed, a new first neuron layer of a second perceptron model may also be calculated. For this purpose, it is necessary only that the address position, in which the model value is stored as the output variable of the last neuron layer of the first perceptron model, is not part of the input variables of the first neuron layer of the second perceptron model.

Figure 8:
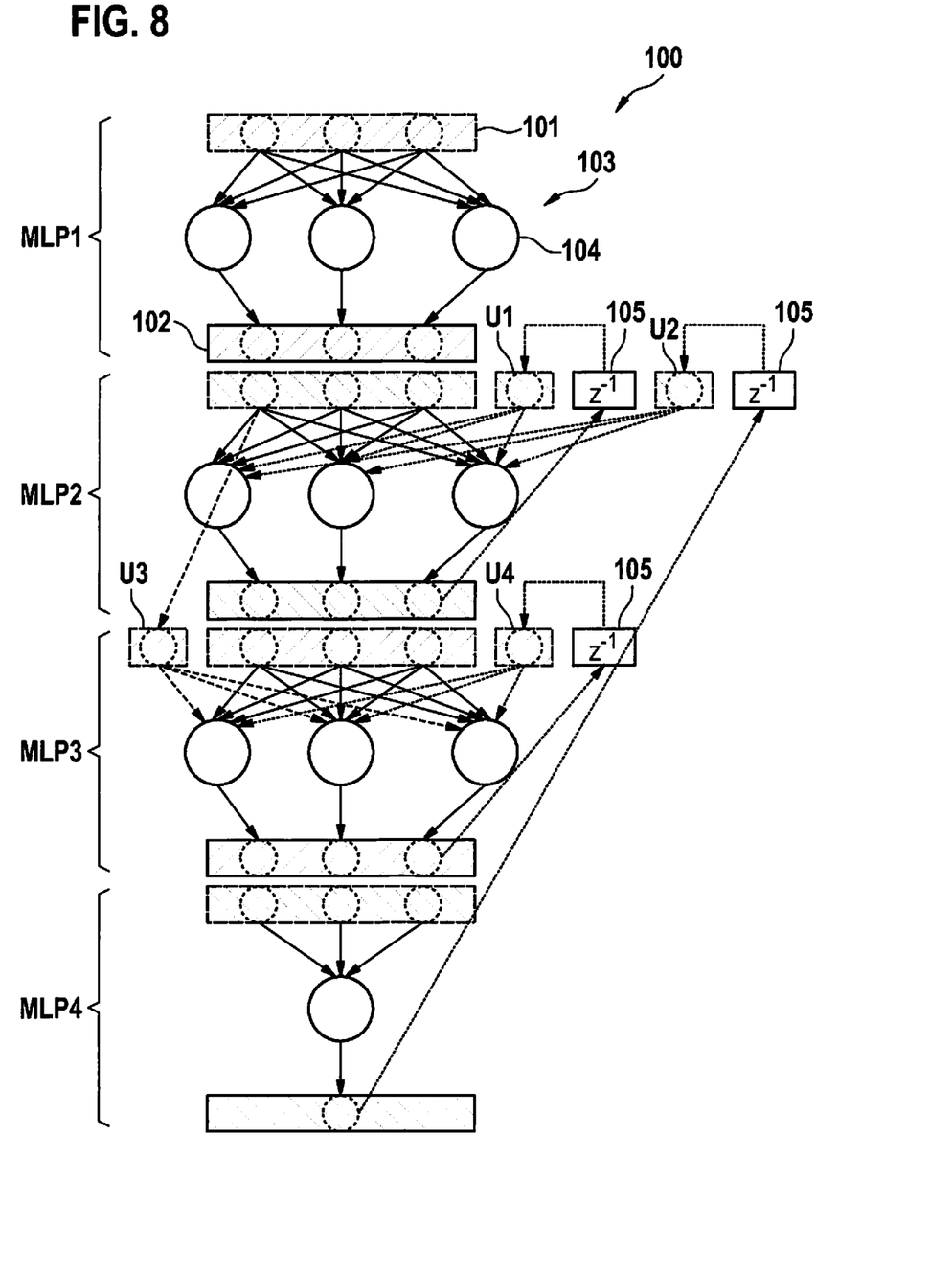
FIG. 8 schematically shows a representation of a perceptron model that includes fed-back neuron layers and fed-forward neuron layers.

FIG. 8 schematically depicts a perceptron model having feedforward and feedback. An example of a four-layered perceptron model 100, which includes neuron layers MLP1 through MLP4, is depicted in FIG. 8. Each of neuron layers MLP1 through MLP4 has an input variable vector position 101, an output variable vector position 102 and neuron layer 103 that includes individual neurons 104. As previously described, the number of neurons 104 of neuron layer 103 may differ from neuron layer to neuron layer.

Input variable vector 101 is stored in a data memory section D of data memory area 122 and output variable vector 102 is stored in a data memory section D of data memory area 122 differing at least partly therefrom. Data memory section D for storing the output variable vector may correspond wholly or in part to data memory section D for storing the input variable vector for calculating the following neuron layer. With suitable overlaps of the definition of data memory sections D for the input variable vectors and output variable vectors of the same, or of different neuron layers, it is possible, while taking an intermediate output variable into consideration, to convert feedbacks and skips for the next neuron layer.

Figure 9:
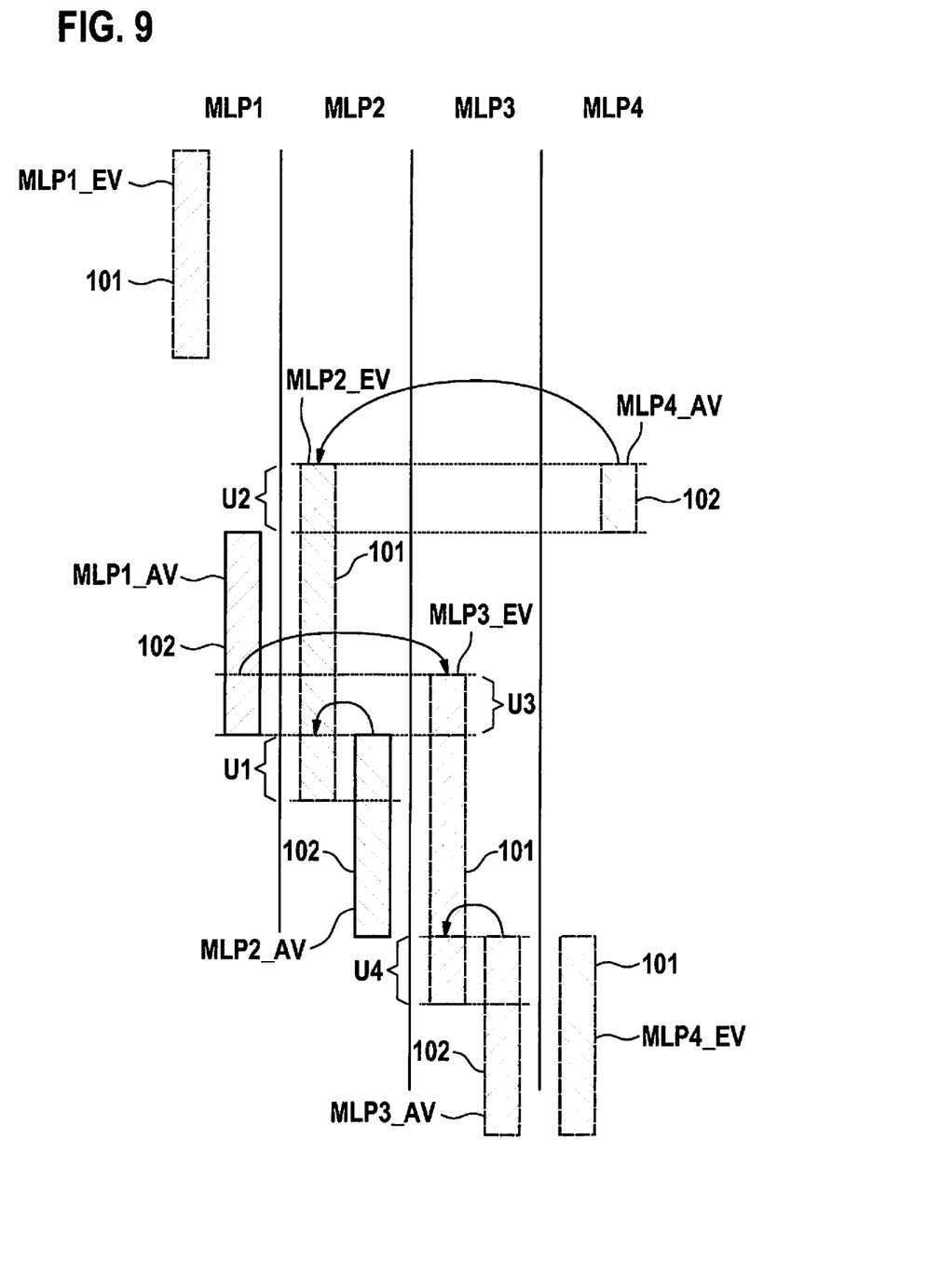
FIG. 9 schematically shows a representation of exemplary address positions of the data memory sections for the input variable vector and output variable vector of the different neuron layers for the perceptron model of FIG. 8.

The address positions of data memory sections D in data memory area 122 are schematically depicted in FIG. 9, data memory sections D being identified by the "designation of the neuron layer"_"EV" for the input variable vector and by the "designation of the neuron layer"_"AV" for the output variable vector. Overlapping areas or overlapping address sections are labelled with U1 through U4.

In the exemplary embodiment of a perceptron model depicted in FIG. 8, for example, a part of the output variable vector of second neuron layer MLP2 is fed back to second neuron layer MLP2. The input variable vector of second neuron layer MLP2 is then formed, together with the output variable vector of first neuron layer MLP1, so that the input variable vector used there is composed of the fed-back part of the output variable vector of second neuron layer MLP2 and of the output variable vector of first neuron layer MLP1. According to the configuration of model calculation unit 22, however, it is provided that the input variable vectors are held in connecting data memory sections D. In this case, the input variable vector of second neuron layer MLP2 is drawn from a connecting data memory section MLP2_EV.

This is achieved by the connection to one another of data memory section MLP1_AV for the output variable vector of first neuron layer MLP1 and data memory section MLP2_AV for the fed-back part of the output variable vector of second neuron layer MLP2. Data memory section MLP2_EV for the input variable vector of second neuron layer MLP2 is then defined in such a way that it includes data memory section MLP1_AV for the output variable vector of first neuron layer MLP1 and data memory section MLP2_AV for the fed-back part of the output variable vector of second neuron layer MLP2. The fed-back part of the output variable vector of second neuron layer MLP2 is referred to as first overlapping address section U1.

The calculation in second neuron layer MLP2 also resorts to the output variable vector of fourth neuron layer MLP4. This is achieved by the connection to one another of data memory section MLP1_AV for the output variable vector of first neuron layer MLP1 and data memory section MLP4_AV of the output variable vector of fourth neuron layer MLP4. Data memory section MLP2_EV for the input variable vector of second neuron layer MLP2 is defined, in addition to the above positioning, in such a way that data memory section MLP2_EV includes data memory section MLP1_AV for the output variable vector of first neuron layer MLP1, data memory section MLP2_AV for the fed-back part of the output variable vector of second neuron layer MLP2 and data memory section MLP4_AV for the fed-back output variable vector of fourth neuron layer MLP4. Data memory section MLP4_AV of the output variable vector of fourth neuron layer MLP4 is referred to as second overlapping address section U2.

The calculation in third neuron layer MLP3 also resorts to a forward-fed part of the output variable vector of first neuron layer MLP1 and to the output variable vector of second neuron layer MLP2. This is achieved by the connection to one another of data memory section MLP1_AV for the output variable vector of first neuron layer MLP1 and data memory section MLP2_AV of the output variable vector of second neuron layer MLP2. Data memory section MLP3_EV for the input variable vector of third neuron layer MLP3 is defined, in addition to the above positioning, in such a way that data memory section MLP3_EV includes data memory section MLP2_AV for the output variable vector of second neuron layer MLP2 and the data memory section for the forward-fed part of the output variable vector of first neuron layer MLP1. The data memory section of the forward-fed part of the output variable vector of first neuron layer MLP1 is referred to as third overlapping address section U3.

The calculation in third neuron layer MLP3 also resorts to a fed-back part of the output variable vector MLP3_AV of the same third neuron layer MLP3, which corresponds to a fourth overlapping address section U4. This is achieved by the connection to one another of data memory section MLP3-AV for output variable vector MLP3_AV of third neuron layer MLP3 and data memory section MLP2_AV of output variable vector MLP2_AV of second neuron layer MLP2.

Data memory section MLP3_EV for the input variable vector of third neuron layer MLP3 is defined, in addition to the above positioning, in such a way that data memory section MLP3_EV includes the data memory section for output variable vector MLP2_AV of second neuron layer MLP2, the data memory section for the forward-fed part of output variable vector MLP1_AV of first neuron layer MLP1 (third overlapping area U3) and the data memory section for the fed-back part of output variable vector MLP3_AV of third neuron layer MLP3 (fourth overlapping area U4).

In general, data memory sections D of the output variable vectors of multiple neuron layers are situated next to one another when these together each form wholly or in part the input variable vector of a neuron layer to be calculated following one of the multiple neuron layers. Since the addressing of the input variable vector generally takes place as a connected address area, data memory section D for the input variable vector of the neuron layer to be calculated in this case is defined in such a way that data memory section D overlaps with data memory section D of the output variable vectors in question.

The individual neuron layers are calculated in chronological succession, starting with the first neuron layer to the final neuron layer, i.e. in this exemplary embodiment, to the fourth neuron layer. In the case of feedbacks, however, a recalculation of the neuron layer, which is fed back to, does not immediately take place. Instead, the fed-back parts of output variable vectors are taken into consideration only in the next complete calculation of the perceptron model. This results in a delayed consideration of the fed-back parts of the output variable vectors. This is symbolized by delay element 105 in FIG. 8. This delay element 105 refers merely to a function and is not actually designed in model calculation unit 22, since this function is fulfilled by the buffering in data memory area 122.

What is claimed is:

1. A model calculation unit for calculating a multilayer perceptron model having a plurality of neuron layers, the model calculation unit being designed in hardware and being hardwired, the model calculation unit comprising:
a processor core which is configured to calculate one or multiple output variables of an output variable vector of a neuron layer of the multilayer perceptron model having a number of neurons as a function of one or of multiple input variables of an input variable vector;
a memory which a data memory area is provided, in which each neuron layer is assigned a data memory section for storing the input variables of the input variable vector and a data memory section for storing the output variables of the output variable vector; and
a DMA unit which is configured to successively instruct the processor core to calculate a neuron layer, in each case based on input variables of the assigned input variable vector and to store the respectively resulting output variables of the output variable vector in the assigned data memory section;
wherein the data memory section for the input variable vector assigned to at least one of the neuron layers at least partially includes in each case the data memory sections of at least two of the output variable vectors of two different neuron layers of the neuron layers.

2. The model calculation unit as recited in claim 1, wherein the data memory section for the input variable vector assigned to at least one of the neuron layers fully includes the data memory section of the output variable vector of a preceding neuron layer.

3. The model calculation unit as recited in claim 1, wherein the data memory section for the input variable vector assigned to at least one of the neuron layers partially includes the data memory section of the output variable vector of a neuron layer other than a preceding neuron layer.

4. The model calculation unit as recited in claim 1, wherein the data memory sections of the at least two output variable vectors of the two different neuron layers of the neuron layers adjoin one another in an address area of the data memory area.

5. The model calculation unit as recited in claim 1, wherein the memory for each of the neuron layers includes a configuration memory area for storing configuration parameters in a respective configuration memory section, and wherein DMA unit is configured to successively instruct the processor core to calculate a neuron layer in each case based on the configuration parameters of a respective configuration memory section and on the input variable vector defined as a result, and to store the respectively resulting output variable vector in a data memory section of the data memory area defined by the corresponding configuration parameters.

6. The model calculation unit as recited in claim 1, wherein the processor core is configured to signal the DMA unit or to signal externally, an end of an instantaneous calculation of the neuron layer, the DMA unit starting the calculation of a next neuron layer of the neuron layers based on configuration parameters stored in an additional configuration memory section.

7. The model calculation unit as recited in claim 1, wherein the processor core is configured to calculate an output variable for each neuron of a neuron layer of the multilayer perceptron model having a number of neurons as a function of one or multiple input variables of an input variable vector, as a function of a weighting matrix having weighting factors and of an offset value predefined for each neuron, a sum of values of the input variables weighted with a weighting factor determined by the neuron and the input variable being calculated for each neuron, and a result being transformed with an activation function in order to obtain the output variable for the neuron in question.

8. The model calculation unit as recited in claim 1, wherein the processor core is formed in a surface area of an integrated module.

9. A control unit that includes a microprocessor at least one model calculation unit, the at least one model calculation unit for calculating a multilayer perceptron model having a plurality of neuron layers, the model calculation unit being designed in hardware and being hardwired, the model calculation unit comprising:

a processor core which is configured to calculate one or multiple output variables of an output variable vector of a neuron layer of the multilayer perceptron model having a number of neurons as a function of one or of multiple input variables of an input variable vector;

a memory which a data memory area is provided, in which each neuron layer is assigned a data memory section for storing the input variables of the input variable vector and a data memory section for storing the output variables of the output variable vector; and a DMA unit which is configured to successively instruct the processor core to calculate a neuron layer, in each case based on input variables of the assigned input variable vector and to store the respectively resulting output variables of the output variable vector in the assigned data memory section;

wherein the data memory section for the input variable vector assigned to at least one of the neuron layers at least partially includes in each case the data memory sections of at least two of the output variable vectors of two different neuron layers of the neuron layers.

10. The control unit as recited in claim 9, wherein the control unit is an integrated circuit.

11. A use of the control unit, comprising:

providing a control unit, the control unit including a microprocessor at least one model calculation unit, the at least one model calculation unit for calculating a multilayer perceptron model having a plurality of neuron layers, the model calculation unit being designed in hardware and being hardwired, the model calculation unit including: a processor core which is configured to calculate one or multiple output variables of an output variable vector of a neuron layer of the multilayer perceptron model having a number of neurons as a function of one or of multiple input variables of an input variable vector, a memory which a data memory area is provided, in which each neuron layer is assigned a data memory section for storing the input variables of the input variable vector and a data memory section for storing the output variables of the output variable vector, and a DMA unit which is configured to successively instruct the processor core to calculate a neuron layer, in each case based on input variables of the assigned input variable vector and to store the respectively resulting output variables of the output variable vector in the assigned data memory section, wherein the data memory section for the input variable vector assigned to at least one of the neuron layers at least partially includes in each case the data memory sections of at least two of the output variable vectors of two different neuron layers of the neuron layers;

using the control unit to control an engine system in a motor vehicle.

* * * * *